United States Patent [19]
Kahrs et al.

[11] Patent Number: 5,551,389
[45] Date of Patent: Sep. 3, 1996

[54] HYDRAULIC PUMP DRIVEN BY AN INTERNAL COMBUSTION ENGINE

[75] Inventors: Manfred Kahrs, Wiesbaden; Gerhard Kunz, Linden, both of Germany

[73] Assignee: ITT Automotive Europe GmbH, Frankfurt, Germany

[21] Appl. No.: 343,549

[22] PCT Filed: May 12, 1993

[86] PCT No.: PCT/EP93/01175

§ 371 Date: Nov. 29, 1994

§ 102(e) Date: Nov. 29, 1994

[87] PCT Pub. No.: WO93/24346

PCT Pub. Date: Dec. 9, 1993

[30] Foreign Application Priority Data

May 30, 1992 [DE] Germany ................ 4217910.6

[51] Int. Cl.⁶ ...................................................... F01M 1/02
[52] U.S. Cl. .................... 123/196 R; 123/90.12
[58] Field of Search ............. 123/196 R, 90.12, 123/90.13

[56] References Cited

U.S. PATENT DOCUMENTS

| | | | |
|---|---|---|---|
| 3,645,647 | 2/1972 | Ciampa et al. | 417/79 |
| 4,858,572 | 8/1989 | Shirai et al. | 123/90.12 |
| 4,896,633 | 1/1990 | Junghans et al. | 123/90.12 |

FOREIGN PATENT DOCUMENTS

| | | |
|---|---|---|
| 590493 | 6/1925 | France . |
| 1867232 | 2/1963 | Germany . |
| 1950883 | 12/1966 | Germany . |
| 2219468 | 10/1973 | Germany . |
| 6610058 | 10/1973 | Germany . |
| 3133111 | 4/1983 | Germany . |
| 3312970 | 10/1984 | Germany . |
| 3516710 | 11/1986 | Germany . |
| 3526194 | 2/1987 | Germany . |
| 4033105 | 4/1992 | Germany . |
| 4105144 | 8/1992 | Germany . |
| 713801 | 4/1981 | United Kingdom . |
| 2057613 | 4/1981 | United Kingdom . |
| 2222123 | 2/1990 | United Kingdom . |

OTHER PUBLICATIONS

M. Kahrs, "Hydroversorgungs—Systeme fur verschiedene Funktionen in PKW," *O+P—Othydraulik und Pneumatik—34*, No. 12, (1990).

Translation entitled "Hydraulic Unit" and marked PCT 7139.

*Primary Examiner*—Erick R. Solis
*Attorney, Agent, or Firm*—Ratner & Prestia

[57] ABSTRACT

A hydraulic pump driven by an internal combustion engine is an externally pressurized radial piston pump, which is internally driven by an eccentric. The hydraulic pump is integrated within the cylinder head of an internal combustion engine.

28 Claims, 2 Drawing Sheets

HYDRAULIC PUMP DRIVEN BY AN INTERNAL COMBUSTION ENGINE

This application is the U.S. national-phase application of PCT International Application No. PCT/EP93/01175.

BACKGROUND OF THE INVENTION

The present invention relates to a hydraulic pump driven by an internal combustion engine. More particularly, the present invention relates to a hydraulic unit or system including a hydraulic pump driven by a camshaft of an internal combustion engine for providing pressure fluid to engine-compartment consumers in automotive vehicles.

A pump of this type is disclosed in German Patent Publication number DE-OS 40 33 105. According to the system disclosed by this reference an internally pressurized radial piston pump is flanged to the engine housing and has an air-flow sensor flap between the pump housing and the engine housing. The phrase "internally pressurized" means that the pressurization of the fluid occurs radially inward relative to the piston. The airflow sensor flap is provided with a central opening, through which a clutch extends that interconnects the pump motor and the drive shaft of the engine.

Undesirably, this known system requires a large number of component parts and the pump of this system necessitates a relatively large mounting space. In particular, in up-to-date automotive vehicles, it is desirable to reduce the dimensions of the units which are accommodated in the engine compartment to the greatest possible extent.

SUMMARY OF THE INVENTION

Therefore, an object of the present invention is to provide a generic hydraulic pump which requires only a reduced number of component parts, which affords greater ease of assembly and, in addition, necessitates less mounting space. This object is achieved by providing a hydraulic pump which is an externally pressurized and internally driven radial piston pump, having at least one pump piston, and which is integrated into the cylinder head of the internal combustion engine. The phrase "externally pressurized" means that the pressurization of the fluid occurs radially outward relative to the pump piston. Similarly, the phrase "internally driven" means that the mechanism which drives the piston is radially inward relative to the pump piston.

Designing a hydraulic pump as an internally driven radial piston pump, driven by an eccentric, for example, is inexpensive because a reduced number of component parts is needed, thereby diminishing the assembling effort. In addition, it is possible to use low-cost pump elements of existing series. Further, an externally pressurized pump may have short dimensions in the axial direction. The radial extension of such a pump is dictated by the number and size of the pump pistons used, both of which can be adapted to the demanded pressure fluid requirement. The attachment of the piston may be conformed to the space requirements, in particular, in case only one piston is used.

The system of the present invention permits a particularly short construction of the pump. Integrating the pump into the cylinder head of the internal combustion engine is an economy in overall size as compared to a flanged component part. More specifically, the pump is actually formed within the cylinder head, for example, by being disposed within the axial length of the cylinder head wall of the cylinder head. The cylinder head may be expediently provided with openings and chambers, which can be prepared for the incorporation of the pump elements, in only a few additional machining steps. These machining steps essentially imply the provision of bores. The operating shaft serving to drive the pump may be any desired spacer shaft of the engine, for example a shaft of the distributor drive, or a shaft of the lubrication pump drive.

According to a preferred embodiment of the present invention, the camshaft, or one of the camshafts of the internal combustion engine, is used as the drive shaft. An eccentric or a cam, possibly a valve cam, which is incorporated in the camshaft may serve as a pump drive. Since the eccentric or the cam serving as the pump drive may be arranged on the camshaft at any desired location, it is possible to arrange the pump at any chosen location, such as at an especially suitable position relative to the cylinder head.

According to another embodiment of the present invention, a free end of a camshaft of the internal combustion engine is provided as the pump drive. This free end of the camshaft must be extended appropriately and configured to drive the pump.

According to another embodiment of the present invention, the end of the camshaft is provided with an eccentric on which a ball race is rotatably mounted. The pump piston or pistons take support on the ball race. The eccentric may be provided by the camshaft having an eccentrically arranged section. It may be less expensive to design the camshaft end such that an eccentric component can be fitted thereon. Thus, the boundary surface between the camshaft end and the eccentric may be designed as a toothed truncated cone-shaped surface, for example, which permits ease of assembly and precludes relative rotation between the camshaft and the eccentric. Of course, when the camshaft is supported appropriately, the eccentric surface may also be machined therein. The rotatable ball race may be seated on the eccentric in a friction bearing or a needle bearing.

The mounting support of the camshaft in the cylinder head according to an aspect of the invention is able to absorb forces which are exerted by the pump on the camshaft. This prevents impairment of the functioning of the pump.

Still shorter overall dimensions of the pump and, hence, of the housing of the internal combustion engine, can be achieved if, according to another aspect of the invention, bearings of the camshaft are provided in the cylinder shaft which are able to absorb the forces exerted by the pump on the camshaft. In this event, the area of the cylinder head between the engine compartment and the pump chamber may have a very thin design.

According to a preferred embodiment of the hydraulic pump according to the present invention which lends itself to particular ease of manufacture, an opening leading to the cylinder head is provided in the cylinder head wall, through which the free end of the camshaft extends. This opening is succeeded by a hollow space accommodating the ball race and the eccentric, and the cylinder head wall contains at least one cylinder bore in which each piston is guided. Also, the suction channel and the pressure channel extend through the cylinder head wall.

According to another embodiment of the present invention, the pump chamber is closed towards the outside by a cover, which permits ease of assembly of the pump.

Still another embodiment of the present invention incorporates part of the suction channel of the pump in the cover and provides restrictors in the cover. This embodiment is favorable in that the cover may be machined independently of the cylinder head and delivered in prefabricated condition for the assembly. The restrictor permits operation of the pump with choked suction, which means that no more than the maximum required fluid volume is supplied, even if the camshaft runs at a higher speed than necessary for the maximum fluid flow. Thus, suction throttling economizes energy.

According to another preferred embodiment of the present invention, the cover in the fringe area is round in shape and is furnished with a circumferential annular groove which forms one boundary surface of a suction channel, while the other boundary surface is formed by the cylinder head. The bores leading from the circumferential annular groove to the side of the cover close to the cylinder head are the restrictors, through which pump pistons may aspirate the pressure fluid. The recess provided in the middle of the cover may serve to accommodate attachment means to attach the eccentric of a camshaft.

According to another embodiment of the present invention, the intermediate reservoir is incorporated in the cylinder head wall. The intermediate reservoir may be produced by providing a hole extending towards the annular channel of the cover in a simple manner.

According to another embodiment of the present invention, the lubricating oil of the internal combustion engine, which is delivered into the intermediate reservoir by a lubricating oil pump, is used as the pressure fluid. Advantageously, leakage from the pump to the engine compartment is tolerable, so that there is no need for additional pressure fluid, and fluid return is permitted from the consumer or consumers into the oil pan of the internal combustion engine.

The hydraulic pump according to the present invention is appropriate for supplying pressure fluid to consumers in automotive vehicles. The hydraulic pump of the present invention is particularly appropriate for supplying pressure fluid to either a camshaft adjusting device, an automatic clutch, a differential lock, a slip control system or a power steering system, or any combination of such consumers at the same time. These consumers are arranged close to the internal combustion engine and must be furnished with pressure fluid.

The pump according to the present invention is particularly well suited for supplying a camshaft adjusting device with pressure fluid, since the camshaft adjusting device also may be attached directly to the cylinder head of the internal combustion engine. Various designs are possible and particularly short pressure fluid conduits are required when the camshaft adjusting device and the hydraulic pump are arranged at the inlet camshaft and/or outlet camshaft on the same side of the engine block. Depending on the respective engine construction, the conduits may be cast-in or drilled channels, or part of the conduits may be provided as screwed pipes.

It is possible to adjust several camshafts irrespective of one another when the camshaft adjusting device and the hydraulic pump are attached at the opposed ends of a camshaft. If desired, further camshafts of the internal combustion engine may be equipped with camshaft adjusting devices. Thus, it is possible to adjust also the camshafts which drive the hydraulic pump.

BRIEF DESCRIPTION OF THE DRAWINGS

Further features of the present invention and their operation can be seen in the drawings, in which.

DETAILED DESCRIPTION OF THE INVENTION

Figure 1:
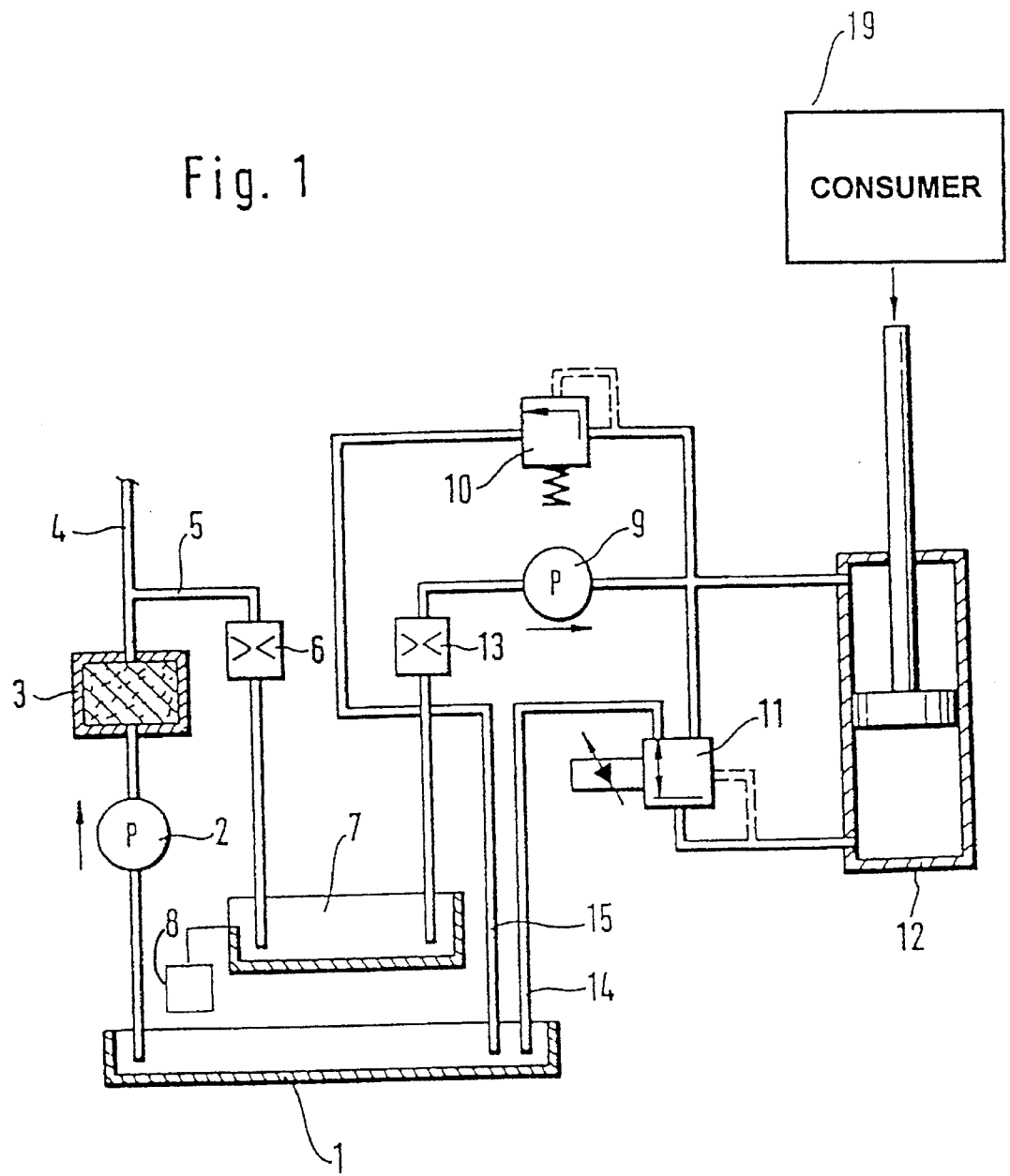
FIG. 1 is a schematic diagram of a hydraulic unit, including a hydraulic pump according to the present invention.

FIG. 1 shows a portion of the lubrication system of an internal combustion engine including an oil pan 1, a lubrication pressure pump 2, a filter 3 and a lubrication pressure line 4. Branching off from the lubrication pressure line 4 is a supply line 5 containing a restrictor 6 which terminates into an intermediate reservoir 7 with an overflow tank 8. The intermediate reservoir 7 is part of a hydraulic unit which comprises a suction-controlled hydraulic pump 9, a pressure-limiting valve 10, an electromagnetically operable control valve 11 and an operating cylinder 12. The operating cylinder 12 may serve to operate a consumer 19, such as a variable camshaft adjusting device. Consumer 19 may represent other consumers, such as an automatic clutch, a differential lock, a slip control system, a power steering system, or combinations thereof.

The suction side of the hydraulic pump 9 is connected to the intermediate reservoir 7 through a restrictor 13 for the purpose of suction control of the delivery rate. The pressure side of the hydraulic pump 9 is in direct connection with the piston rod side of the operating cylinder 12. To perform adjusting movements, the side of the operating cylinder 12 remote from the piston rod is connected, by way of the control valve 11, either with the pressure side of the hydraulic pump 9 or, through a return line 14, with the oil pan 1. In an intermediate position, the control valve 11 is closed, and the piston of the operating cylinder 12 is stopped in a position which it reaches due to the surrounding pressurization. Also, a return line 15 leads from the pressure-limiting valve 10 to the oil pan 1.

Variations in the operating pressure of the lubrication system of an internal combustion engine are substantial due to the rotational speed of the engine and the operating temperature. Nonetheless, the hydraulic unit of the present invention may expediently use the lubrication system of an internal combustion engine in spite of such variations in the operating pressure in order to deliver operating media to the hydraulic pump 9 driven by the internal combustion engine. The unpressurized intermediate reservoir permits suction pressure control of the hydraulic pump 9 so that the delivery rate of the hydraulic pump 9 can easily be limited to an appropriate maximum value, while small losses are involved, despite major rotational speed variations of the pump drive.

Figure 2:
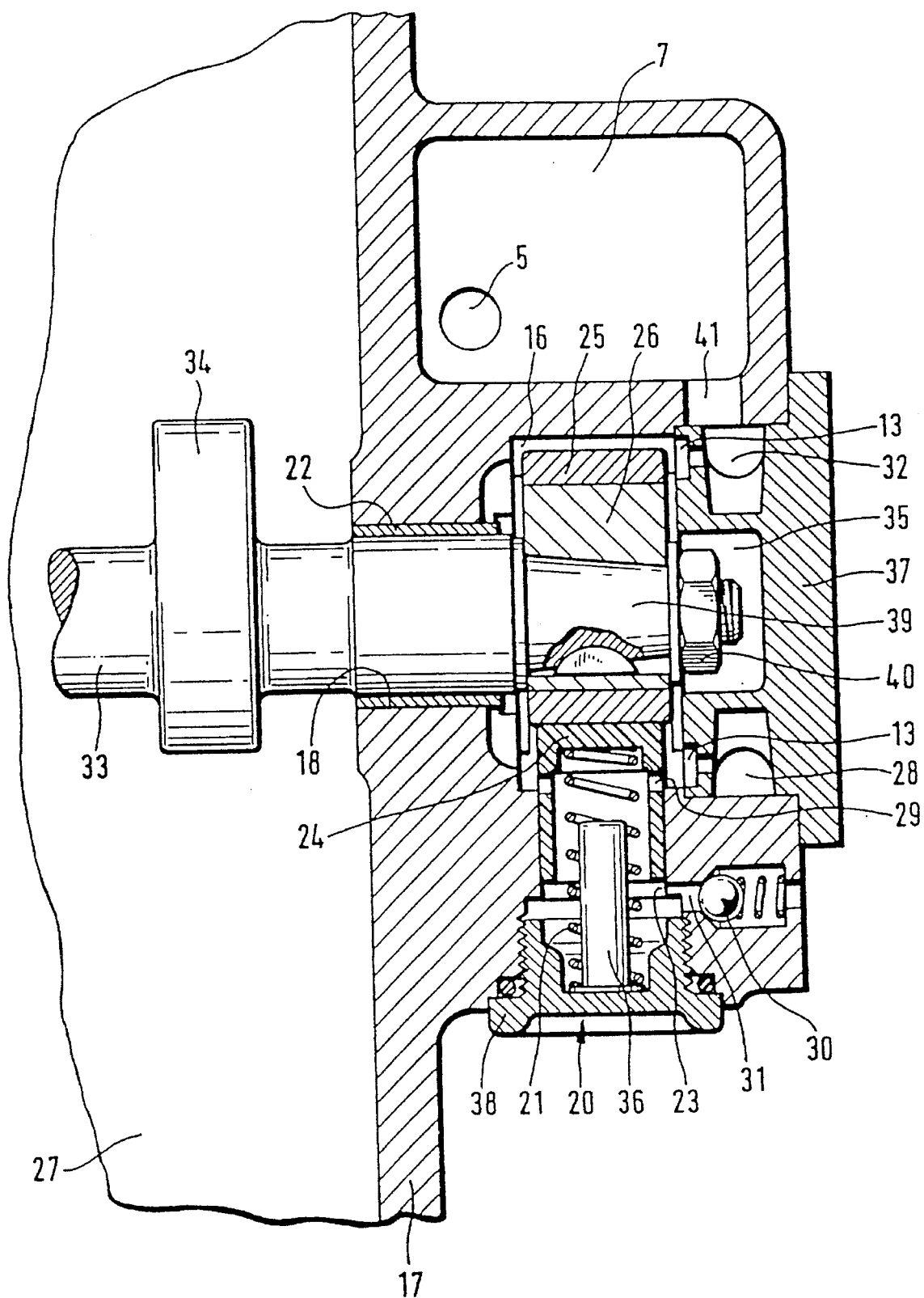
FIG. 2 is a partial cross-section of the hydraulic pump according to the present invention.

FIG. 2 shows an embodiment of the hydraulic pump 9 (shown as pump element 20 in FIG. 2) according to the present invention. On the left side (as shown in FIG. 2) is the cylinder head 27, the right-hand boundary portion of which is a cylinder head wall 17. An opening 18 is contained in the cylinder head wall 17, in which the camshaft 33 (having a cam 34) is seated by way of a bearing 22. Fitted to the right-hand end of the camshaft 33 is a conical section 39, which is of toothed design and on which an eccentric 26 is seated which is toothed as well. The toothed engagement precludes relative rotation between the eccentric 26 and the conical section 39 of the camshaft 33. The eccentric 26 is protected against axial displacement by means of a set-screw 40 fitted to the end of the camshaft 33. A ball race 25 is rotatably mounted on the eccentric 26.

In the cylinder head wall 17, the intermediate reservoir 7 is arranged, into which the supply line 5 from the lubrication pressure pump 2 terminates and which is provided with an overflow tank 8 (not shown in FIG. 2). Channel 41, which extends from the intermediate reservoir 7, forms part of the suction channel 28 which is continued in a circumferential annular groove 32 in the cover 37. Cover 37 confines the hollow space 16, formed in the cylinder head wall 18, towards the outside. Towards the inside, it is furnished with a recess 35, in which the set-screw 40 is arranged, as well as bores, serving as restrictors 13, between the annular groove 32 and the hollow space 16.

A cylinder bore 23 is arranged in the cylinder head wall 17 in which a piston 24 is guided which takes support on the ball race 25 and is urged onto the ball race by a spring 21. On one side, downwardly as viewed in FIG. 2, the piston 24 is open and furnished with intake bores 29 having a throttling effect. In the uppermost possible position of the piston 24, as viewed in FIG. 2, intake bores 29 are in communication with the hollow space 16.

Spring 21 is guided by a guiding means 36 and bears against the attaching element 38. There is a connection between the interior of the piston 24 and the pressure channel 31, in which a check valve 30 is arranged and which extends through the cylinder head wall 17 outwardly.

In operation, the pressure fluid supplied by the lubrication pressure pump 2 of the internal combustion engine into the intermediate reservoir 7 propagates through the suction channel 28, composed of channel 41 and annular groove 32, to the restrictors 13 which allow passage of a reduced fluid volume only. Pressure fluid is conveyed through the restrictors 13 into the hollow space 16. Rotation of the camshaft 33, through the eccentric 26 and the ball race 25, causes the piston 24 to perform upward and downward strokes. Spring 21 is rated such that it prevents the piston 24 from lifting off the ball race 25. When piston 24 is in the aspirating position, which is its uppermost position as viewed in FIG. 2, pressure fluid is aspirated from the hollow space 16 through the intake bore 29 into the interior of the piston 24.

During the downward stroke of the piston 24, the intake bores 29 having a throttling effect are moved away from the area of the hollow space 16 and closed by the cylinder bore 23, thereby pressurizing and pumping the pressure fluid into the pressure channel 31. During the subsequent upward stroke of the piston 24, the check valve 30 prevents return flow of the pressure fluid and, thus, prevents a pressure decrease in the direction of the consumer. As a result, vacuum develops in the interior of the piston 24, whereby the pressure fluid prevailing in the hollow space 16 is aspirated into the interior of the piston 24, as soon as the intake bore 29 is in communication with the hollow space 16 again.

Although illustrated and described herein with reference to certain specific embodiments, the claims are not intended to be limited to the details of the specific embodiments. Rather, the claims should be read to include various modifications of the details of the specific embodiments without departing from the spirit of the invention.

List of Reference Numerals:

1 oil pan
2 lubrication pressure pump
3 filter
4 lubrication pressure line
5 supply line
6 restrictor
7 intermediate reservoir
8 overflow tank
9 hydraulic pump
10 pressure-limiting valve
11 control valve
12 operating cylinder
13 restrictor
14 return line
15 return line
16 hollow space
17 cylinder head wall
18 opening
19 consumer
20 pump element
21 spring
22 bearing
23 cylinder bore
24 piston
25 ball race
26 eccentric
27 cylinder head
28 suction channel
29 intake bore
30 check valve
31 pressure channel
32 annular groove
33 camshaft
34 cam
35 recess
36 guiding means
37 cover
38 attaching element
39 conical section
40 set-screw
41 channel

We claim:

1. A hydraulic unit including a hydraulic pump, driven by a camshaft of an internal combustion engine, for the supply of engine-compartment consumers in automotive vehicles, the suction side of the hydraulic pump being connected to an intermediate reservoir with an unrestricted overflow tank, into which operating medium from the lubrication system is supplied by the lubrication pressure pump of the internal combustion engine, characterized in that the hydraulic pump is an externally pressurized and internally driven radial piston pump including at least one pump piston and being integrated into the cylinder head of the internal combustion engine.

2. A hydraulic unit as claimed in claim 1, characterized in that the radial piston pump is driven by a specially configured free end of the camshaft.

3. A hydraulic unit as claimed in claim 2, characterized in that the free end of the camshaft is provided with an eccentric on which a ball race is rotatably mounted, the pump piston(s) taking support on the ball race.

4. A hydraulic unit as claimed in claim 3, characterized in that the camshaft is mounted in a bearing in the cylinder head wall.

5. A hydraulic unit as claimed in claim 1, characterized in that the camshaft is mounted in the cylinder head, and the mounting support absorbs forces which are exerted on the camshaft by the hydraulic pump.

6. A hydraulic unit as claimed in claim 5, characterized in that an opening leading to the cylinder head is provided in the cylinder head wall, through which the free end of the camshaft extends, in that the opening is succeeded by a hollow space accommodating the ball race and the eccentric, in that the cylinder head wall contains at least one cylinder bore in which each one piston is guided, and in that the suction channel and the pressure channel extend through the cylinder head wall.

7. A hydraulic unit as claimed in claim 6, characterized in that the hollow space is closed by a cover.

8. A hydraulic unit as claimed in claim 7, characterized in that part of the suction channel is configured in the cover, and in that restrictors are provided in the cover.

9. A hydraulic unit as claimed in claim 8, characterized in that the cover is of round shape in its fringe area, that it is furnished with a circumferential annular groove, in that at least one bore extends from the side of the cover close to the cylinder head wall to the circumferential annular groove, and in that a recess is provided in the middle of the side of the cover close to the cylinder head.

10. A hydraulic unit as claimed in claim 1, characterized in that the intermediate reservoir is incorporated in the cylinder head wall.

11. A hydraulic unit as claimed in claim 1, characterized in that the hydraulic pump serves for the supply of either a camshaft adjusting device, an automatic clutch, a differential lock, a slip control system or a power steering system, or even a plurality of such consumers at the same time.

12. A hydraulic system for providing pressure fluid to consumers in automotive vehicles, said system comprising:
 a lubrication system including a lubrication pressure pump for supplying pressure fluid;
 an intermediate reservoir in fluid communication with said lubrication system for storing pressure fluid from said lubrication pressure pump;
 a camshaft;
 a cylinder head; and
 an externally pressurized and internally driven radial piston pump, which:
  (a) is driven by said camshaft,
  (b) is integrated within said cylinder head,
  (c) has a suction side connected to said intermediate reservoir, and
  (d) includes at least one pump piston.

13. A hydraulic system in accordance with claim 12, wherein said camshaft has a free end, which is disposed radially inward relative to said at least one pump piston, for driving said radial piston pump.

14. A hydraulic system in accordance with claim 13 further comprising:
 an eccentric coupled to said free end of said camshaft; and
 a ball race rotatably mounted on said eccentric and on which said at least one pump piston takes support.

15. A hydraulic system in accordance with claim 14, wherein said cylinder head includes a cylinder head wall and further comprising a bearing disposed between said camshaft and said cylinder head wall for mounting said camshaft in said cylinder head wall.

16. A hydraulic system in accordance with claim 12, wherein said camshaft is mounted in said cylinder head to absorb forces which are exerted on said camshaft by said piston pump.

17. A hydraulic system in accordance with claim 15, wherein said cylinder head wall includes:
 an opening through which said camshaft extends;
 a hollow space accommodating said ball race and said eccentric;
 at least one cylinder bore for containing said at least one piston;
 a suction channel for delivering pressure fluid to said pump; and
 a pressure channel, radially outward relative to said at least one pump piston, through which pressure fluid is conducted from said pump.

18. A hydraulic system in accordance with claim 17, further comprising a cover for closing said hollow space.

19. A hydraulic system in accordance with claim 18 wherein:
 a portion of said suction channel is configured in said cover; and
 said cover is provided with restrictors.

20. A hydraulic system in accordance with claim 19 wherein said cover:
 is round in its fringe area;
 is furnished with a circumferential annular groove and at least one bore extending from the side of said cover close to said cylinder head wall to said circumferential annular groove; and
 is furnished with a recess in the middle said cover close to said cylinder head wall.

21. A hydraulic system in accordance with claim 18 wherein said intermediate reservoir is incorporated within said cylinder head wall.

22. A hydraulic system in accordance with claim 12 wherein said hydraulic pump serves for the supply of at least one of a camshaft adjusting device, an automatic clutch, a differential lock, a slip control system and a power steering system.

23. A hydraulic system in accordance with claim 12 further comprising an unrestricted overflow tank in fluid communication with said intermediate reservoir.

24. A hydraulic system in accordance with claim 15 wherein said pump is disposed within the axial length said cylinder head wall.

25. A hydraulic system for providing pressure fluid to consumers in automotive vehicles, said system comprising:
 a lubrication system including a lubrication pressure pump for supplying pressure fluid;
 an intermediate reservoir in fluid communication with said lubrication system for storing pressure fluid from said lubrication pressure pump;
 a camshaft; and
 a radial piston pump, which:
  (a) includes at least one pump piston,
  (b) is internally driven by said camshaft which is disposed radially inward relative to said at least one pump piston, and
  (c) has a suction side connected to said intermediate reservoir.

26. A hydraulic system in accordance with claim 25 further comprising a cylinder head wall which defines a pressure channel, radially outward relative to said at least one pump piston, through which pressure fluid is conducted from said pump.

27. A hydraulic system in accordance with claim 26 is wherein said pump is integrated within said cylinder head wall.

28. A hydraulic system in accordance with claim 26 wherein said pump is disposed within the axial length said cylinder head wall.

* * * * *

UNITED STATES PATENT AND TRADE MARK OFFICE
CERTIFICATE OF CORRECTION

PATENT NO.   : 5,551,389
DATED        : September 3, 1996
INVENTOR(S)  : Kahrs et al.

It is certified that error appears in the above-identified patent and that said Letters Patent is hereby corrected as shown below:

At column 8, line 22, after "middle", insert --of--.

Signed and Sealed this

Eleventh Day of March, 1997

Attest:

BRUCE LEHMAN

Attesting Officer

Commissioner of Patents and Trademarks